United States Patent
Liu et al.

(10) Patent No.: US 8,582,238 B1
(45) Date of Patent: Nov. 12, 2013

(54) SYSTEMS AND METHODS FOR PROVIDING PERPENDICULAR MAGNETIC WRITERS HAVING GRADIENT MAGNETIC MOMENT SIDE SHIELDS

(75) Inventors: Feng Liu, San Ramon, CA (US); Zhigang Bai, Milpitas, CA (US); Dehua Han, Fremont, CA (US); Ming Sun, Pleasanton, CA (US); Yugang Wang, Milpitas, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 216 days.

(21) Appl. No.: 13/279,105

(22) Filed: Oct. 21, 2011

(51) Int. Cl.
*G11B 5/33* (2006.01)

(52) U.S. Cl.
USPC ............................................. 360/125.3

(58) Field of Classification Search
USPC ............................................. 360/125.3
See application file for complete search history.

(56) References Cited

U.S. PATENT DOCUMENTS

| | | |
|---|---|---|
| 5,838,521 A | 11/1998 | Ravipati |
| 6,456,467 B1 | 9/2002 | Mao et al. |
| 6,628,478 B2 | 9/2003 | Gill |
| 7,061,726 B2 | 6/2006 | Ohtomo et al. |
| 7,180,712 B1 | 2/2007 | Li et al. |
| 7,221,539 B2 | 5/2007 | Takano et al. |
| 7,295,401 B2 | 11/2007 | Jayasekara et al. |
| 7,876,534 B2 * | 1/2011 | Chou et al. ..................... 360/319 |
| 8,051,552 B2 * | 11/2011 | Jiang et al. ................. 29/603.16 |
| 8,339,741 B2 * | 12/2012 | Zhang et al. ............. 360/125.74 |
| 8,470,186 B2 * | 6/2013 | Chen et al. ....................... 216/22 |
| 2008/0273276 A1 | 11/2008 | Guan |
| 2009/0147410 A1 * | 6/2009 | Jiang et al. ..................... 360/319 |
| 2010/0328816 A1 | 12/2010 | Guan et al. |
| 2011/0116190 A1 | 5/2011 | Guan |
| 2011/0116195 A1 * | 5/2011 | Cazacu et al. ................. 360/319 |

\* cited by examiner

*Primary Examiner* — Mark Blouin

(57) ABSTRACT

Systems and methods for providing perpendicular magnetic writers having gradient magnetic moment side shields are provided. In one case, the system includes a pole having a leading edge and trailing edge, a leading shield positioned closer to the leading edge than the trailing edge, the leading shield having a leading shield moment, a trailing shield positioned closer to the trailing edge than the leading edge, the trailing shield having a trailing shield moment greater than the leading shield moment, and a side shield positioned along side of the pole, the side shield including a gradient magnetic moment progressing from a first side shield moment to a second side shield moment, where the first side shield moment is about equal to the leading shield moment, and where the second side shield moment is about equal to the trailing shield moment and positioned closer to the trailing shield than the leading shield.

27 Claims, 4 Drawing Sheets

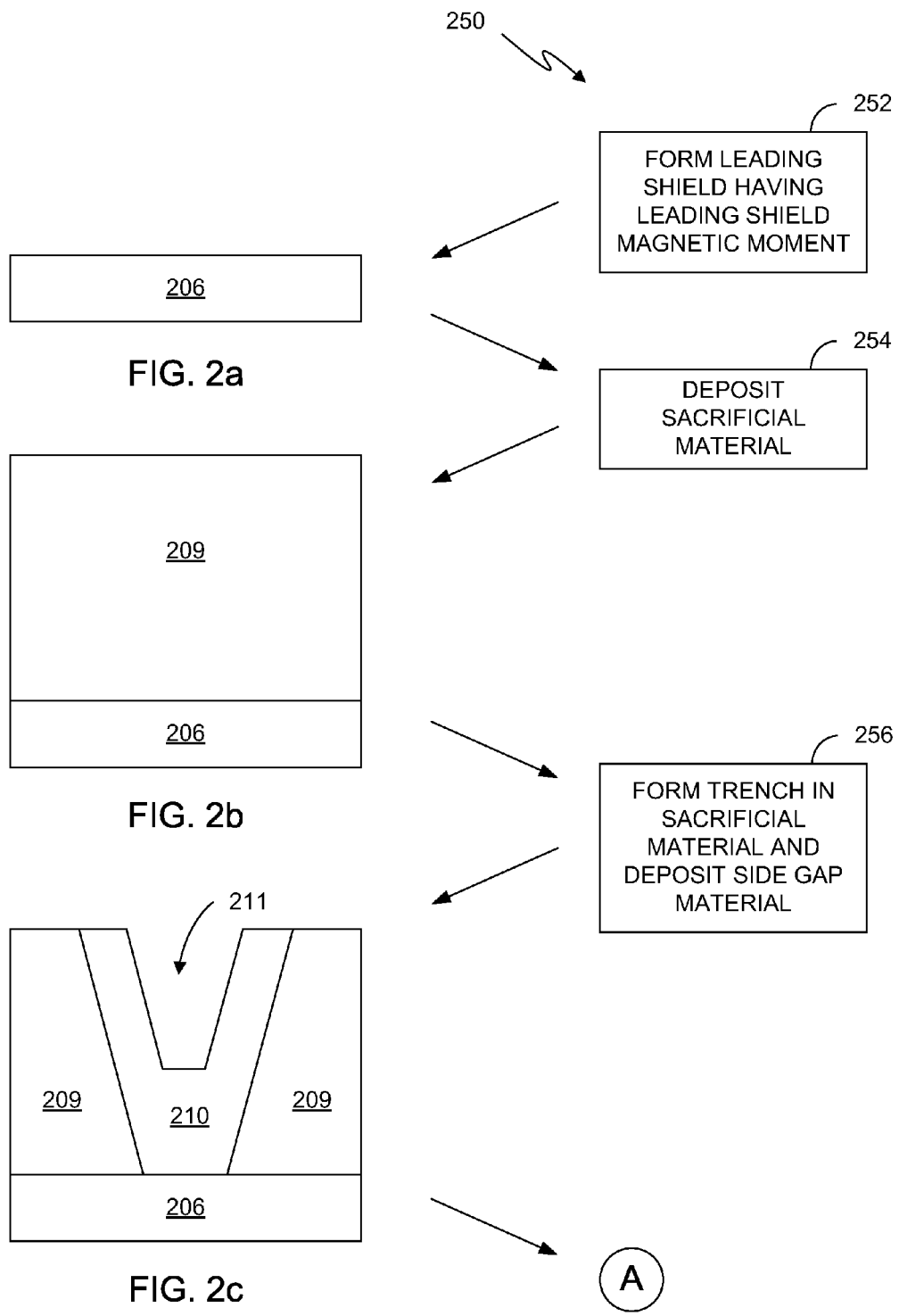

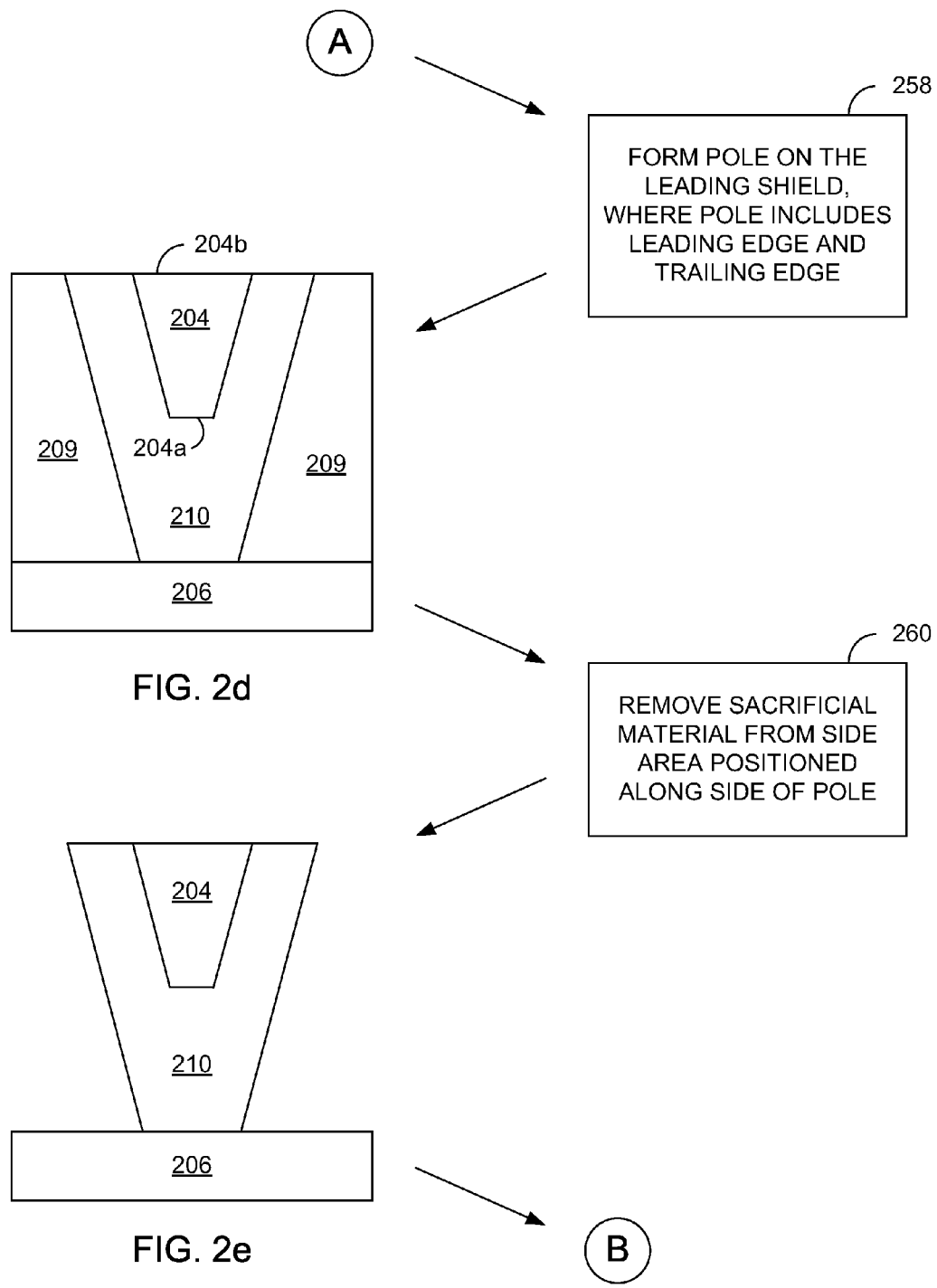

SYSTEMS AND METHODS FOR PROVIDING PERPENDICULAR MAGNETIC WRITERS HAVING GRADIENT MAGNETIC MOMENT SIDE SHIELDS

FIELD

The present invention relates generally to magnetic recording, and more specifically, to systems and methods for providing perpendicular magnetic writers having gradient magnetic moment side shields.

BACKGROUND

As recording areal density advances towards nearly one terabyte per square inch in conventional perpendicular magnetic recording (PMR) schemes, full wrap around shields designs can be used to achieve high track density as well as adjacent track interference (ATI) margin. In such conventional designs incorporating a full wrap around shield, the side shield is often deposited by plating with one fixed magnetic moment value. However, the presence of trailing shield, the side shield, and the leading shield in such a full wrap around shield design can also result in complicated magnetic characteristics. Such complicated magnetic characteristics often result in undesirable effects such as off track erasure, adjacent track interference (ATI), and/or wide area track erasure (WATER).

SUMMARY

Aspects of the invention relate to systems and methods for providing perpendicular magnetic writers having gradient magnetic moment side shields. In one embodiment, the invention relates to a perpendicular magnetic recording head including a pole having a leading edge and a trailing edge, a leading shield positioned closer to the leading edge than the trailing edge, the leading shield having a leading shield magnetic moment, a trailing shield positioned closer to the trailing edge than the leading edge, the trailing shield having a trailing shield magnetic moment greater than the leading shield magnetic moment, and a side shield positioned along a side of the pole, the side shield including a gradient magnetic moment progressing from a first side shield magnetic moment to a second side shield magnetic moment, where the first side shield magnetic moment is about equal to the leading shield magnetic moment, and where the second side shield magnetic moment is about equal to the trailing shield magnetic moment and positioned closer to the trailing shield than the leading shield.

In another embodiment, the invention relates to a method for forming a perpendicular magnetic recording head, the method including forming a leading shield having a leading shield magnetic moment, forming a pole on the leading shield, where the pole includes a leading edge and a trailing edge, where the leading edge is positioned closer to the leading shield than the trailing edge, removing a material from a side area positioned along a side of the pole, depositing a side shield in the side area, the side shield including a gradient magnetic moment progressing from a first side shield magnetic moment to a second side shield magnetic moment, and forming a trailing shield on the trailing edge of the pole, the trailing shield having a trailing shield magnetic moment greater than the leading shield magnetic moment, where the first side shield magnetic moment is about equal to the leading shield magnetic moment, and where the second side shield magnetic moment is about equal to the trailing shield magnetic moment and positioned closer to the trailing shield than the leading shield.

BRIEF DESCRIPTION OF THE DRAWINGS

FIGS. 2a to 2g illustrate a sequence of side views of a perpendicular magnetic recording head having a side shield with a gradient magnetic moment and corresponding processing actions illustrating a process for forming the perpendicular magnetic recording head in accordance with one embodiment of the invention.

DETAILED DESCRIPTION

Figure 1:
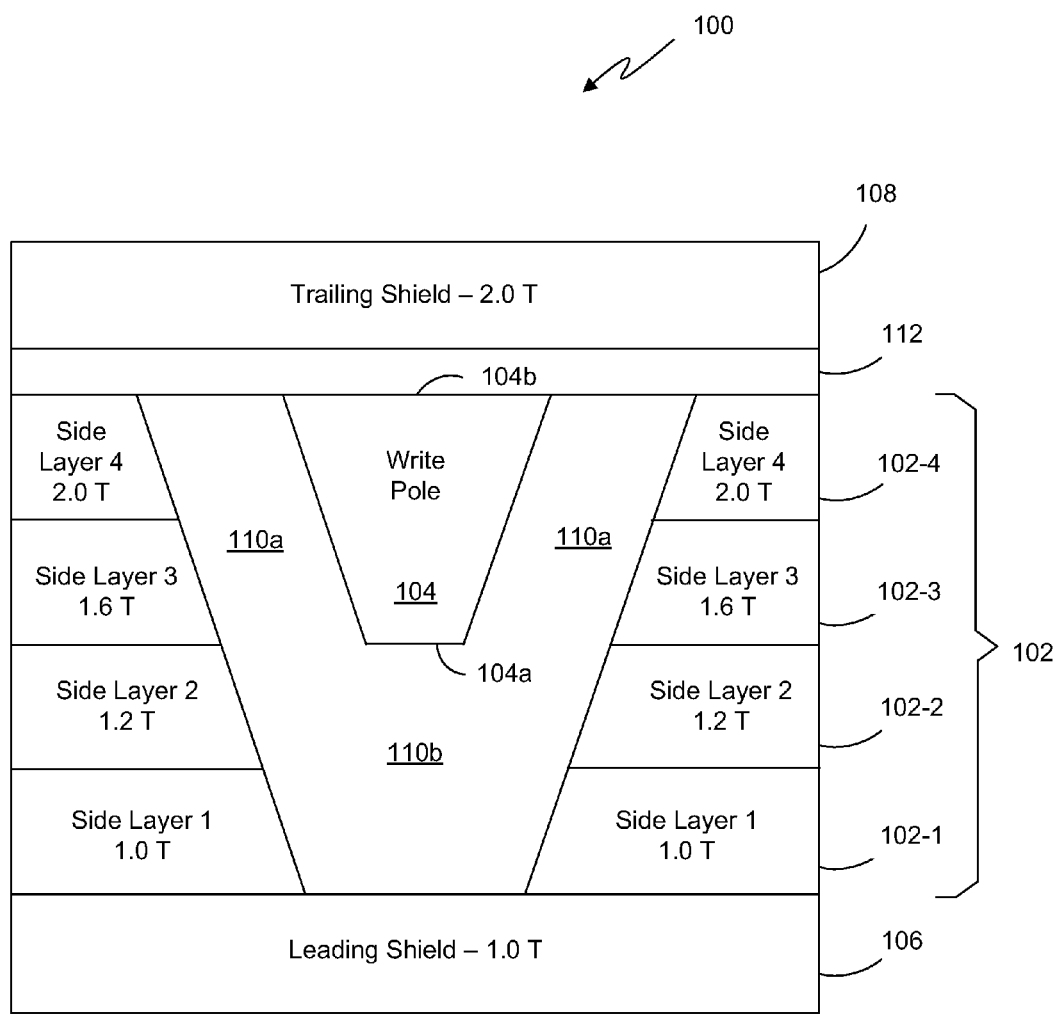
FIG. 1 is cross sectional view of a perpendicular magnetic recording head having a full wrap around side shield with a gradient magnetic moment positioned around a write pole in accordance with one embodiment of the invention.

Referring now to the drawings, embodiments of perpendicular magnetic recording (PMR) heads having side shields with gradient magnetic moments and processes for forming the perpendicular magnetic recording heads are illustrated. The PMR heads each include a leading shield having a preselected leading shield magnetic moment, a write pole positioned between side shields having the gradient magnetic moment and on the leading shield, and a trailing shield having a preselected trailing shield magnetic moment. In order to counter the potential for mismatched magnetic moments at the junction/interface between the side shield and the leading shield, and also at the junction/interface between the side shield and the trailing shield, the side shield moment is configured as a gradient magnetic moment that progresses from a first side shield moment at the leading shield interface to a second side shield moment at the trailing shield interface. In several embodiments, the first side shield moment is made to be about equal to the leading shield moment. Similarly, in several embodiments, the second side shield moment is made to be about equal to the trailing shield moment. In several embodiments, two additional side shield moments formed in adjacent layers are positioned between layers for each of the first side shield moment and the second side shield moment resulting in a four layer gradient side shield. In other embodiments, more than or less than four layer side shield moments can be used.

In several embodiments, existing processes for forming perpendicular magnetic recording (PMR) heads can be used while using special techniques to deposit and form the side shields to achieve the desired gradient magnetic moment. In some embodiments, the special depositing techniques can involve an electro-plating process or a sputtering process.

In PMR full wrap around shield designs not having side shields with gradient magnetic moments, the magnetic moments for trailing shield and side shield are often mismatched. As a result, the mismatched magnetic moment at the trailing shield and the side shield results in flux leakage at the interface of the trailing shield and side shield. Such flux leakage is a source of off track erasure causing adjacent track interference and/or wide area track erasure. In addition, for the PMR designs not having gradient moment side shields, the magnetic moments for the leading shield and the side shield are also often mismatched. In such case, the mismatched magnetic moment results in charge nucleation at the interface of the side shield and the leading shield. Such charge nucleation can cause such negative effects as reduced adjacent track interference margin and/or wide area track erasure.

FIG. 1 is cross sectional view of a perpendicular magnetic recording head 100 having a full wrap around side shield 102 with a gradient magnetic moment positioned around a write pole 104 in accordance with one embodiment of the invention. The perpendicular magnetic recording head 100 also includes a leading shield 106 having a leading shield magnetic moment of 1.0 Tesla (T) and a trailing shield 108 having a trailing shield magnetic moment of 2.0 Tesla (T). In other embodiments, the leading shield magnetic moment and trailing shield magnetic moment can have other suitable values. The side shield 102 has a four layer stacked configuration including a base or first side shield layer 102-1, a second side shield layer 102-2 on the first side shield layer 102-1, a third side shield layer 102-3 on the second side shield layer 102-2, and a fourth side shield layer 102-4 on the third side shield layer 102-3.

The first side shield layer 102-1 has a magnetic moment of about 1.0 T to match the magnetic moment of the leading shield 106. The second side shield layer 102-2 has a magnetic moment of about 1.2 T that is just slightly greater than the magnetic moment of the first side shield layer 102-1. The third side shield layer 102-3 has a magnetic moment of about 1.6 T that is slightly greater than the magnetic moment of the second side shield layer 102-2. The fourth side shield layer 102-4 has a magnetic moment of about 2.0 T that is just slightly greater than the magnetic moment of the third side shield layer 102-3 and about equal to the magnetic moment of the trailing shield 108. In other embodiments, the side shield layers can have other suitable magnetic moments.

In the embodiment illustrated in FIG. 1, the side shield 102 has four layers with four different magnetic moments. In other embodiments, the side shield 102 can have as few as two layers with just two different magnetic moments that are set to roughly match the moments of the leading shield and trailing shield. In still other embodiments, the side shield 102 can have more than four layers with different magnetic moments progressing from a first moment about equal to the leading shield moment to a second moment about equal to the trailing shield moment. In some embodiments, the first moment is set to be up to about 20 percent higher than the leading shield moment, and the second moment is set to be up to about 20 percent less than the trailing shield moment. In several embodiments, the side shield 102 can have 3, 5, 6, 7 or more layers having different magnetic moments progressing along a preselected gradient.

In several embodiments, the perpendicular magnetic recording head 100 includes a second side shield (e.g., see left side shield of FIG. 1) that has a layered magnetic moment structure that corresponds to that of the side shield 102 positioned on the opposite side of the write pole 104.

The perpendicular magnetic recording head 100 also includes a side gap 110a, a leading gap 110b, and a write gap 112 that separate the write pole 104 from the surrounding shield layers. The write pole 104 includes a leading edge 104a and a trailing edge 104b, where the leading edge 104a is positioned closer to the leading shield 106 than the trailing edge 104b.

In the embodiment illustrated in FIG. 1, each of the side shield 102 layers has a thickness of about 45 nanometers (nm). The leading gap 110b, or shortest distance between the write pole leading edge 104a and the leading shield 106, is about 90 nm. The shield gap 110a, or shortest distance between the write pole 104 and the side shield 102, is about 65 nm. The write pole 104 has a height of about 90 nm. In other embodiments, the components of the perpendicular magnetic recording head 100 can have other suitable dimensions.

In several embodiments, the side shield 102 is made of NiFe and the layered magnetic moments thereof are formed using an electro-plating process that includes plating current modulation and/or other suitable techniques.

In a number of embodiments, the perpendicular magnetic recording head 100 having the gradient moment side shield 102 provides improved magnetic moment matching at both the interface between the side shield and leading shield, and the interface between the side shield and trailing shield. As a result, the off track erasure field is reduced or minimized, thereby reducing adjacent track interference and wide area track erasure. At the same time, the perpendicular magnetic recording head with the gradient moment side shield can provide comparable on track field and field gradient performance as compared to conventional PMR heads. As such, the perpendicular magnetic recording heads with the gradient moment side shields enable high recording areal density and improved reliability.

In one embodiment, the side gap 110a and leading gap 110b can be formed of Ru. In several embodiments, the leading shield 106 is formed using a NiFe alloy. In one such embodiment, the NiFe alloy includes about 80 percent Ni and about 20 percent Fe. In several embodiments, the write pole 104 is formed of a CoFe alloy or a CoNiFe alloy. In one such embodiment, the write pole 104 is formed of the CoFe alloy and it includes about 25 to 40 percent Co and about 60 to 75 percent Fe. In another embodiment, the write pole 104 is formed of the CoNiFe alloy and it has less than about 3 percent Ni while the other component materials have about the same concentration as recited in the previous sentence. In several embodiments, the write pole 104 is formed of a high moment magnetic material (e.g., up to about 2.45 T). In a number of embodiments, the trailing shield 108 is formed of a NiFe alloy (e.g., having about 68 percent Fe) or a CoNiFe alloy (e.g., soft magnetic material) providing a medium or high magnetic moment. In other embodiments, each of the layers can be formed of other suitable materials.

Figure 2F:
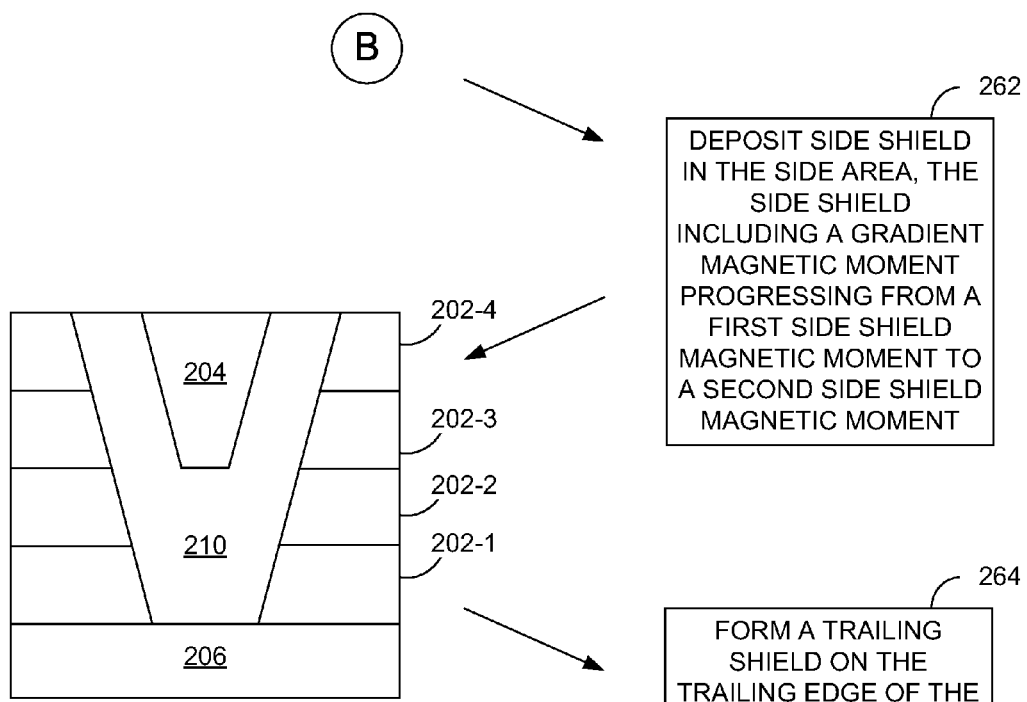

FIGS. 2a to 2g illustrate a sequence of side views of a perpendicular magnetic recording head having a side shield with a gradient magnetic moment and corresponding processing actions illustrating a process 250 for forming the perpendicular magnetic recording head in accordance with one embodiment of the invention. In particular embodiments, the process 250 can be used to form the perpendicular magnetic recording head of FIG. 1. As illustrated in FIG. 2a, the process first forms (252) a leading shield 206 having a preselected leading shield magnetic moment. In one embodiment, the leading shield magnetic moment can be 1.0 T. In other embodiments, the leading shield magnetic moment can have another suitable magnetic moment. As illustrated in FIG. 2b, the process then deposits (254) one or more sacrificial materials 209 on the leading shield 206. In several embodiments, the sacrificial materials 209 include one or more non-magnetic sacrificial materials commonly used in the art for forming a trench.

As illustrated in FIG. 2c, the process forms (256) a trench 211 for a pole in the sacrificial material 209 and deposits one or more side gap materials 210. In several embodiments, the side gap materials 210 include one or more non-magnetic, conductive or non-conductive, materials commonly used in the art for side gap spaces.

As illustrated in FIG. 2d, the process then forms (258) a write pole 204 on the leading shield 206, and on the side gap material 210. The write pole or pole 204 has a leading edge 204a and a trailing edge 204b, where the leading edge 204a is positioned closer to the leading shield 206 than the trailing edge 204b. As illustrated in FIG. 2e, the process then removes (260) material from side areas positioned along both sides of the pole 204. In several embodiments, the removal is a precise sub-process that involves removing enough side area material to leave a preselected thickness for the remaining side gap 210. In one embodiment, the removal is performed using an etching process or another suitable material removal process known in the art.

As illustrated in FIG. 2f, the process then deposits (262) one or more side shield materials in the cleared side area(s) such that the side shield has a gradient magnetic moment progressing from a first side shield magnetic moment to a second side shield magnetic moment. In several embodiments, the first/base side shield magnetic moment is preselected to be about equal to the leading shield magnetic moment. Similarly, the top side shield magnetic moment is preselected to be about equal to a preselected trailing shield magnetic moment (the trailing shield yet to be deposited). In a number of embodiments, the side shield can have a layered or stacked structure including two or more layers where each layer has a different magnetic moment. In the embodiment illustrated in FIG. 2f, the side shield is deposited with four layers, including the first side shield layer 202-1 with a first magnetic moment of about 1.0 T, a second side shield layer 202-2 with a magnetic moment of about 1.2 T, a third side shield layer 202-3 with a magnetic moment of about 1.6 T, and a fourth side shield layer 202-4 with a magnetic moment of about 2.0 T. In other embodiments, more than or less than four layers can be used, and each of the layers can have other suitable magnetic moments than those previously discussed.

In several embodiments, the side shield materials include NiFe. In such case, the layered side shield moments can be created using an electro-plating sub-process and plating current modulation. In another embodiment, the layered side shield moments can be created using a sputtering sub-process. In other embodiments, the side shield layers can be formed of other suitable materials.

Figure 2G:
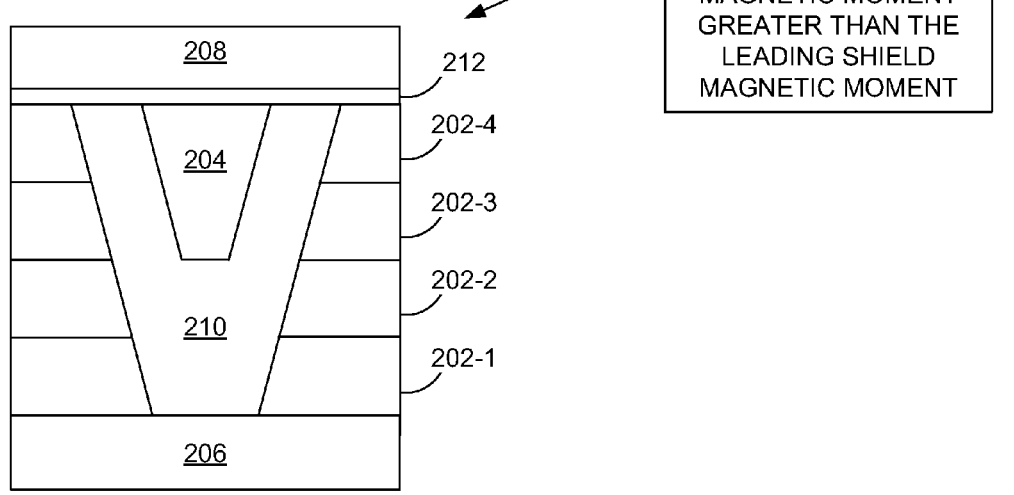

As illustrated in FIG. 2g, the process then forms (264) a trailing shield 208 on the trailing edge of the pole 204, the trailing shield 208 having a trailing shield magnetic moment (e.g., about 2.0 T) greater than the leading shield magnetic moment (e.g., about 1.0 T). In several embodiments, the process first deposits a write gap layer 212 and then deposits the trailing shield 208 on the write gap layer 212.

In one embodiment, the side gap 210 can be formed of Ru. In one embodiment, the sacrificial material 209 can be Al2O3, C, or another suitable material. In several embodiments, the leading shield 206 is formed using a NiFe alloy. In one such embodiment, the NiFe alloy includes about 80 percent Ni and about 20 percent Fe. In several embodiments, the write pole 204 is formed of a CoFe alloy or a CoNiFe alloy. In one such embodiment, the write pole 204 is formed of the CoFe alloy and it includes about 25 to 40 percent Co and about 60 to 75 percent Fe. In another embodiment, the write pole 204 is formed of the CoNiFe alloy and it has less than about 3 percent Ni while the other component materials have about the same concentration as recited in the previous sentence. In several embodiments, the write pole 204 is formed of a high moment magnetic material (e.g., up to about 2.45 T). In a number of embodiments, the trailing shield 208 is formed of a NiFe alloy (e.g., having about 68 percent Fe) or a CoNiFe alloy (e.g., soft magnetic material) providing a medium or high magnetic moment. In other embodiments, each of the layers can be formed of other suitable materials.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A perpendicular magnetic recording head comprising:
a pole having a leading edge and a trailing edge;
a leading shield positioned closer to the leading edge than the trailing edge, the leading shield having a leading shield magnetic moment;
a trailing shield positioned closer to the trailing edge than the leading edge, the trailing shield having a trailing shield magnetic moment greater than the leading shield magnetic moment; and
a side shield positioned along a side of the pole, the side shield comprising a gradient magnetic moment progressing from a first side shield magnetic moment to a second side shield magnetic moment,
wherein the first side shield magnetic moment is about equal to the leading shield magnetic moment, and
wherein the second side shield magnetic moment is about equal to the trailing shield magnetic moment and positioned closer to the trailing shield than the leading shield.

2. The recording head of claim 1, further comprising a second side shield positioned along a second side of the pole, the second side shield comprising a second gradient magnetic moment about equal to the gradient magnetic moment of the side shield.

3. The recording head of claim 1, wherein the side shield comprises:
a first side layer comprising the first side shield magnetic moment; and
a second side layer comprising the second side shield magnetic moment, the second side layer on the first side layer.

4. The recording head of claim 1, gradient magnetic moment comprises:
at least N side shield magnetic moments,
wherein N is a positive integer, and
wherein each of the at least N side shield magnetic moments is greater than the first side shield magnetic moment and less than second side shield magnetic moment.

5. The recording head of claim 4, wherein the gradient magnetic moment comprises increasing magnetic moments from the first side shield magnetic moment to the second side shield magnetic moment.

6. The recording head of claim 4, wherein N is a number selected from the group of numbers consisting of 3, 4, and 7.

7. The recording head of claim 4, wherein the side shield comprises:
a first layer comprising the first side shield magnetic moment;
a second layer comprising the second side shield magnetic moment; and
at least N layers, each comprising one of the at least N side shield magnetic moments,
wherein the at least N layers are on the first layer, and
wherein the second layer is on the at least N layers.

8. The recording head of claim 7, wherein a thickness of each of the first layer, the second layer, and the at least N layers is about equal.

9. The recording head of claim 1, wherein each of the leading shield, the trailing shield, and the side shield is spaced apart from the pole by a preselected distance.

10. The recording head of claim 1, wherein the first side shield magnetic moment is greater than the leading shield magnetic moment by at most 20 percent.

11. The recording head of claim 1, wherein the second side shield magnetic moment is less than the trailing shield magnetic moment by at most 20 percent.

12. The recording head of claim 1, wherein the side shield comprises NiFe.

13. A method for forming a perpendicular magnetic recording head, the method comprising:
   forming a leading shield having a leading shield magnetic moment;
   forming a pole on the leading shield, wherein the pole comprises a leading edge and a trailing edge, wherein the leading edge is positioned closer to the leading shield than the trailing edge;
   removing a material from a side area positioned along a side of the pole;
   depositing a side shield in the side area, the side shield comprising a gradient magnetic moment progressing from a first side shield magnetic moment to a second side shield magnetic moment; and
   forming a trailing shield on the trailing edge of the pole, the trailing shield having a trailing shield magnetic moment greater than the leading shield magnetic moment,
   wherein the first side shield magnetic moment is about equal to the leading shield magnetic moment, and
   wherein the second side shield magnetic moment is about equal to the trailing shield magnetic moment and positioned closer to the trailing shield than the leading shield.

14. The method of claim 13, wherein the removing the material from the side area positioned along the side of the pole comprises etching the material from the side area.

15. The method of claim 13, wherein the depositing the side shield in the side area comprises depositing the side shield in the side area using a process selected from the group consisting of an electro-plating process and a sputtering process.

16. The method of claim 13, wherein the depositing the side shield in the side area comprises electro-plating the side shield in the side area using plating current modulation.

17. The method of claim 13, further comprising:
   removing a material from a second side area positioned along a second side of the pole; and
   depositing a second side shield in the second side area, the second side shield comprising a second gradient magnetic moment about equal to the gradient magnetic moment of the side shield.

18. The method of claim 13, wherein the side shield comprises:
   a first side layer comprising the first side shield magnetic moment; and
   a second side layer comprising the second side shield magnetic moment, the second side layer on the first side layer.

19. The method of claim 13, gradient magnetic moment comprises:
   at least N side shield magnetic moments,
   wherein N is a positive integer, and
   the at least N side shield magnetic moments is greater than the first side shield magnetic moment and less than second side shield magnetic moment.

20. The method of claim 19, wherein the gradient magnetic moment comprises increasing magnetic moments from the first side shield magnetic moment to the second side shield magnetic moment.

21. The method of claim 19, wherein N is a number selected from the group of numbers consisting of 3, 4, and 7.

22. The method of claim 19, wherein the side shield comprises:
   a first layer comprising the first side shield magnetic moment;
   a second layer comprising the second side shield magnetic moment; and
   at least N layers, each comprising one of the at least N side shield magnetic moments,
   wherein the at least N layers are on the first layer, and
   wherein the second layer is on the at least N layers.

23. The method of claim 22, wherein a thickness of each of the first layer, the second layer, and the at least N layers is about equal.

24. The method of claim 13, wherein each of the leading shield, the trailing shield, and the side shield is spaced apart from the pole by a preselected distance.

25. The method of claim 13, wherein the first side shield magnetic moment is greater than the leading shield magnetic moment by at most 20 percent.

26. The method of claim 13, wherein the second side shield magnetic moment is less than the trailing shield magnetic moment by at most 20 percent.

27. The method of claim 13, wherein the side shield comprises NiFe.

* * * * *